US005880982A

United States Patent [19]
Evans

[11] Patent Number: 5,880,982
[45] Date of Patent: Mar. 9, 1999

[54] ERROR DETECTING DIGITAL ARITHMETIC CIRCUIT

[75] Inventor: Richard A. Evans, Malvern, Great Britain

[73] Assignee: The Secretary of State for The Defence Evaluation and Research Agency in Her Britannic Majesty'Government of the United Kingdom of Great Britain and Northern Ireland, Farnborough, United Kingdom

[21] Appl. No.: 809,098

[22] PCT Filed: Sep. 11, 1995

[86] PCT No.: PCT/GB95/02139

§ 371 Date: Mar. 19, 1997

§ 102(e) Date: Mar. 19, 1997

[87] PCT Pub. No.: WO96/09586

PCT Pub. Date: Mar. 28, 1996

[30]   Foreign Application Priority Data

Sep. 22, 1994 [GB] United Kingdom .................. 9419072

[51] Int. Cl.$^6$ .............................. G06F 11/00; G06F 7/00; G01R 31/28
[52] U.S. Cl. .................... 364/737; 364/738; 364/715.01; 371/22.5
[58] Field of Search .................................... 364/771, 765, 364/737, 736.5, 738, 768, 716.03, 759, 760, 715.01; 371/22.5, 67.1, 57.1

[56]         References Cited

U.S. PATENT DOCUMENTS 3,166,737  1/1965  Sparacio .
3,649,817  3/1972  Keller et al. ............................. 364/738
3,665,394  5/1972  Lender et al. .......................... 371/67.1
4,001,570  1/1977  Gooding et al. ........................ 364/771
5,140,545  8/1992  Vassiliadis et al. ..................... 364/765
5,495,431  2/1996  Jang ................................... 364/715.01
5,561,619  10/1996  Watanabe et al. .................. 364/736.5
5,629,945  5/1997  Sulzberger et al. ................... 371/22.5
5,798,958  8/1998  Wong ..................................... 364/768

OTHER PUBLICATIONS

Patent Abstracts of Japan, vol. 13, No. 460 (P–94618 Oct. 1989 & JP A01 180 043(Fujitsu Ltd) 18 Jul. 1989.
Patent Abstracts of Japan, vol. 16, No. 500 (P–1437), 15 Oct. 1992 & JP A 04 180 134(NEC Ibaraki Ltd) 26 Jun. 1992.
IEE Proceedings E. Computers & Digital Techniques, vol. 139, No. 2, Mar. 1992, Stevenage GB pp. 123–130, XP000288123 C.–L. Wey, "Concurrent error detection in array dividers by alternating input data".
IEE Proceedings E. Computers & Digital Techniques, vol. 135, No. 2, Mar. 1988, Stevenage GB pp. 87–94, S.–W. Chan et al, "Systematic design strategy for concurrent error diagnosable iterative logic arrays".

*Primary Examiner*—Ayaz R. Sheikh
*Assistant Examiner*—Rijue Mai
*Attorney, Agent, or Firm*—Nixon & Vanderhye PC

[57]          ABSTRACT

A digital arithmetic circuit includes an inverting circuit connected to a digital circuit in which errors are to be detected. An operand input to the circuit produces an output result in a first operation which is stored in a comparison circuit. The operand is inverted by the inverting circuit on a second cycle of operation of the circuit and the output result is compared by the comparison circuit with that from the first operation. A non-zero result from the comparison indicates the occurrence of an error or errors in the operation of the circuit.

16 Claims, 6 Drawing Sheets

HALF ADDER

EXAMPLE 1 - FAULT-FREE CIRCUIT:

ERROR INDICATION : P+ (-P) = 00000000

Fig. 5B

EXAMPLE 2 - PARTIAL PRODUCT $p_{11}$ STUCK-AT-1:

ERROR INDICATION : P+ (-P) = 00001000

Fig. 5C

EXAMPLE 3 - INPUT $c_0$ STUCK-AT-0 AND OUTPUT $p_6$ STUCK-AT-1

ERROR INDICATION : P+ (-P) = 00111110

ERROR DETECTING DIGITAL ARITHMETIC CIRCUIT

This application is a 371 of PCT (GB 95) 02139 filed Sep. 11, 1995.

BACKGROUND OF THE INVENTION

1. Field of the Invention

This invention relates to a digital arithmetic circuit and more particularly to such a circuit having error detection properties.

2. Discussion of Prior Art

Digital arithmetic circuits are widely used in many fields of activity. Electronic technology has progressed rapidly over the past decade, and integrated circuit and system technology has increased in complexity as a result. Increasing complexity presents a number of problems, but in particular it results in reduced reliability due to ageing, transient malfunctions in operation and production faults during manufacture. These problems increase as circuit and system complexity increases and device size continues to decrease. A further aspect of increasing circuit complexity is that it may not be economically possible to fully test all aspects of a complex circuit or system. Such a circuit or system may therefore be produced in a form giving rise to unidentified errors. Detecting circuit errors becomes increasingly important for safety-critical applications, such as aircraft systems.

Methods of detecting errors are known, such as those employing Hamming codes as described in "Error Detecting and Error Correcting Codes", R W Hamming, Dell Systems Technical Journal, Vol 29 No 1 pp 147–160, January 1950. Hamming codes are parity check codes useful for checking data transmissions and storage. However, they have the important disadvantage that they are not preserved by arithmetic operations and cannot be used in arithmetic circuits.

Codes which overcome the limitation regarding preservation in arithmetic operations are described in "Error Detecting Code, Self-Checking Circuits and Applications", J Wakerly, Elsevier, North Holland Inc, 1978. A simple example is the so-called AN code. Here, input data words are multiplied by an applied multiplicand. Outputs which are not a multiple of the multiplicand can therefore be construed as containing errors.

Arithmetic codes all require additional circuitry to carry out initial coding and error checking. Additionally, more hardware is needed to implement the arithmetic function because coded data words are longer than uncoded ones.

Time redundant approaches to error detection have also been implemented. These methods require extra processing time compared with that normally required to perform the desired operation. Consequently, an operation which could be completed in one time unit without error detection might take two time units or more if carried out in an error detecting system employing time redundancy. An example of time redundancy has been suggested by Patel and Fung ("Concurrent Error Detection in ALU's by Recomputing with Shifted Operands", J H Patel and L Y Fung, IEEE Trans. on Computers, Vol C-31, pp 589–595, July 1982). This involves calculating a given result twice whilst shifting the position of the bits of the operands between the first and second calculation. After realigning the two output results, any error introduced by the hardware will appear in a different position in the two output values, and will be detectable. This approach is applicable to circuits such as arithmetic logic units (ALUs) which are constructed in a modular fashion with little or no connectivity between modules. This has the disadvantage that extra hardware modules are needed to handle the shifted operand.

The method of T H Chen et al ("Design of Concurrent Error-Detectable VLSI-Based Array Dividers", T H Chen, L G Chen, Y S Chang, Proc IEEE International Conference on Computer Design (ICCD), 1992) exploits circuit regularity to separate a circuit into two identical parts, each of which performs only half of the required calculation. Each part of the circuit is then used twice to generate two complete results which should be identical in the absence of errors. However, this approach is limited to circuits have regularity which enables separation for performing functions of calculations.

An adding and subtracting system is described in "Patent Abstracts of Japan", Volume 13 Number 460 (P-946), 18 Oct., 1989 which adds the result of the operations (A-B) and (B-A) and a zero check is then performed on this result.

SUMMARY OF THE INVENTION

It is an object of the invention to provide an alternative form of digital arithmetic circuit with error detection properties.

The present invention provides a digital arithmetic circuit comprising processing means for performing an arithmetic operation on at least one input operand and for generating a result signal in response thereto and means for inputting said at least one input operand to the processing means, characterized in that the processing means comprises:

(i) means for inverting at least one operand input to the processing means, (ii) means for performing said arithmetic operation on said at least one input operand and for performing said arithmetic operation on at least one inverted operand, and (iii) means for comparing result signals from said operations to provide an indication of the occurrence or otherwise of an error in circuit operation, and that the processing means is arranged to perform an arithmetic operation other than the arithmetic operations of exclusively addition and subtraction on the at least one input operand.

For the purpose of this specification the term "operand" is defined as a signed binary number on which an arithmetic operation is to be performed by the digital arithmetic circuit of the invention. The invention is appropriate for operands for which the sin of the operand is implicit in the bit representation of the number, ie there is not an additional bit indicating the sign. The invention is therefore appropriate for systems using complement representations of numbers such as 2's-complement representation. The term "inverting" in relation to an operand means altering the sign of a number whilst retaining its magnitude. For a 2's complement number this involves changing all bits in the numbers from 0 or 1 to 1 or 0 respectively as appropriate, and adding 1 to the result. The terms "inverted" and "non-inverted" are to be construed accordingly.

The invention has the advantage that it provides a means for error detection in arithmetic circuits which may be implemented simply compared to prior art circuits. Input operands are applied twice to the circuit and are inverted at the second application. The inversion enables errors to be detected when the two outputs are compared by the comparison means.

The invention provides the capability of detecting errors caused by circuit faults, both permanent and transient, which alter the logic value at a node of the circuit. It is also capable of detecting multiple errors. It is applicable to existing digital signal processing (DSP) circuits and may be used for self-testing applications.

The digital arithmetic circuit of the invention may provide an output value indicating the location of an error within the circuit. This facilitates error correction once the fault location has been determined.

In a preferred embodiment the invention is arranged to produce a zero output from the comparing means when there is no fault in the circuit. A non-zero output indicates the occurrence of an error.

In a further embodiment, the invention incorporates at least two like digital arithmetic one of which is arranged to perform an operation on the operand and the other to perform a concurrent operation on the inverted operand.

In addition the invention provides a digital arithmetic circuit comprising processing means for performing an arithmetic operation on at least one input operand and for generating a result signal in response thereto and means for inputting said at least one input operand to the processing means, characterized in that the processing means comprises:

(i) means for inverting at least one operand input to the processing means, (ii) means for performing said arithmetic operation (a) on one or more operands excluding inverted operands, and (b) on one or more operands including at least one inverted operand, and (iii) means for comparing result signals from said operations to provide an indication of the occurrence or otherwise of an error in circuit operation.

The invention further provides a method of detecting errors in operation of a digital arithmetic circuit characterized in that the method includes the steps of:

(i) supplying at least one input operand to the circuit;

(ii) inverting at least one of the at least one input operand;

(iii) performing an arithmetic operation (a) on one or more operands excluding inverted operands, and (b) on one or more operands including at least one inverted operand, and (iv) comparing circuit outputs resulting from said operations to provide a comparison value indicative of the occurrence or otherwise of an error or errors in circuit operation.

BRIEF DESCRIPTION OF THE DRAWINGS

The invention will now be described in relation to the drawings in which.

DETAILED DISCUSSION OF PREFERRED EMBODIMENTS

Figure 1:
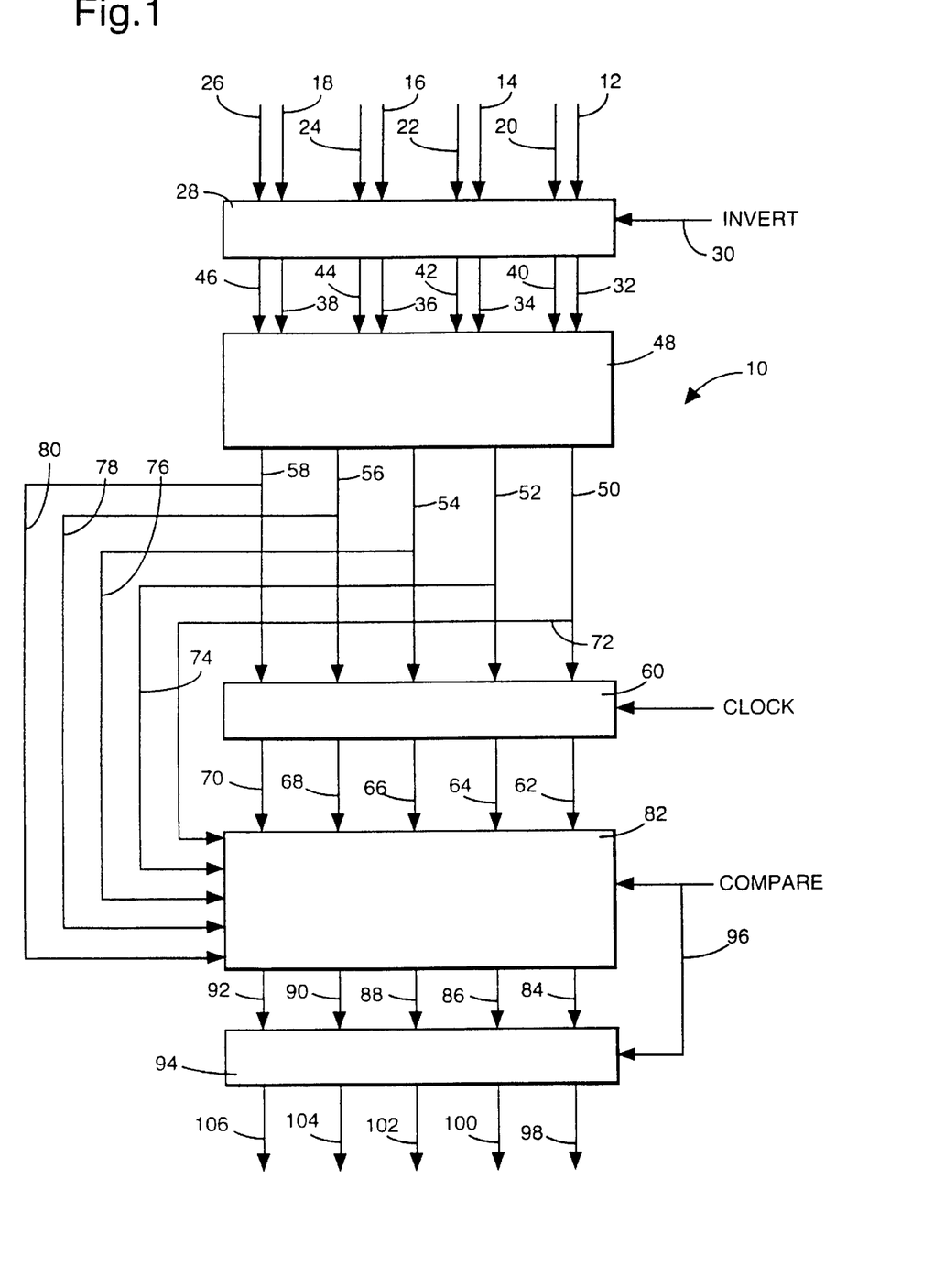
FIG. 1 is a digital arithmetic circuit of the invention.

Referring to FIG. 1, there is shown a block diagram of a digital arithmetic circuit of the invention, the circuit being indicated generally by 10. The circuit 10 is arranged to receive two input numbers, A and B, not shown in FIG. 1, which are both 2's complement numbers, and to add A and B to produce an output 2's complement sum S. A and B are four-bit numbers, with respective bits $a_0$ to $a_3$ and $b_0$ to $b_3$. Generally, A and B have bits $a_i$ and $b_j$ respectively (i=0 to 3, j=0 to 3) where i=0 and j=0 each represent a least significant bit (1sb) and i=3 and j=3 each represent a most significant bit (msb). Sum S is a five-bit number with respective bits $s_0$ to $s_4$; generally, S has bits $s_k$ where k=0 and k=4 respectively represent the 1sb and msb of S. S has a fifth bit $s_4$ because addition of two four-bit numbers A and B may produce a carry bit.

Numbers A and B are input to the circuit 10 on input lines marked 12, 14, 16, 18 and 20, 22, 24, 26 respectively, all of which are connected to an inverting circuit 28. Inverting circuit 28 has an enabling input 30. The inverting circuit 28 is arranged to generate outputs of −A and −B i.e, it inverts numbers A and B, when it receives an input signal on enabling input 30 which is high. The inversion of the signs of A and B is carried out by inverting each respective bit a and b and adding 1 to the respective resulting number. When the enabling input signal is low the output from the inverting circuit 28 is A and B; that is, the numbers A and B are transmitted through the inverting circuit 28 without any operation being performed on them. Output bits $a_0, a_1, a_2, a_3$, and $b_0, b_1, b_2, b_3$ from the inverting circuit 28 are output on lines, 32, 34, 36, 38 and 40, 42, 44, 46 respectively.

Lines 32 to 38 and 40 to 46 connect inverting circuit 28 to adder circuit 48. Adder circuit 48 is a binary ripple adder. It adds the 2's complement numbers A and B, or their inverted forms −A and −B, to produce a 2's complement result. Output bits $s_0, s_1, s_2, s_3$ and $s_4$ from adder circuit 48 are output on lines 50, 52, 54, 56 and 58 respectively. Output lines 50 to 58 connect adder circuit 48 to a group of clock-activated latches 60 in which one latch is allocated to each line. The latches 60 are arranged to pass their contents to output lines 62, 64, 66, 68 and 70 when the input clock signal is high and to retain these signal values on the respective latch outputs when the clock signal is low.

A separate set of output lines 72, 74, 76, 78 and 80 are taken from output lines 50 to 58 respectively. These lines carry the output bits $s_0$ to $s_4$ from the adder circuit 48 when the inverter 28 has been enabled by enable input 30. Thus, when the circuit 48 outputs the sum of −A and −B the output on lines 50 to 58 are conveyed on lines 72 to 80 respectively.

The output lines 62 to 70 and 72 to 80 are connected to a comparison circuit 82. The bits conveyed by these output lines are respectively the bits from the latches 60, and the bits from the adder circuit 48. The comparison circuit 82 compares the respective bits and produces a five-bit output, $r_0, r_1, r_2, r_3$ and $r_4$. These bits are output on lines 84, 86, 88, 90 and 92. Output lines 84 to 92 are connected to a latch 94 which has an enabling input 96. The latch 94 has five output lines 98, 100, 102, 104 and 106. The latch 94 is arranged to receive bits on lines 84 to 92 and output them on lines 98 to 106 when enabling input 96 is high, and retain them when the enabling input is low.

Figure 2:
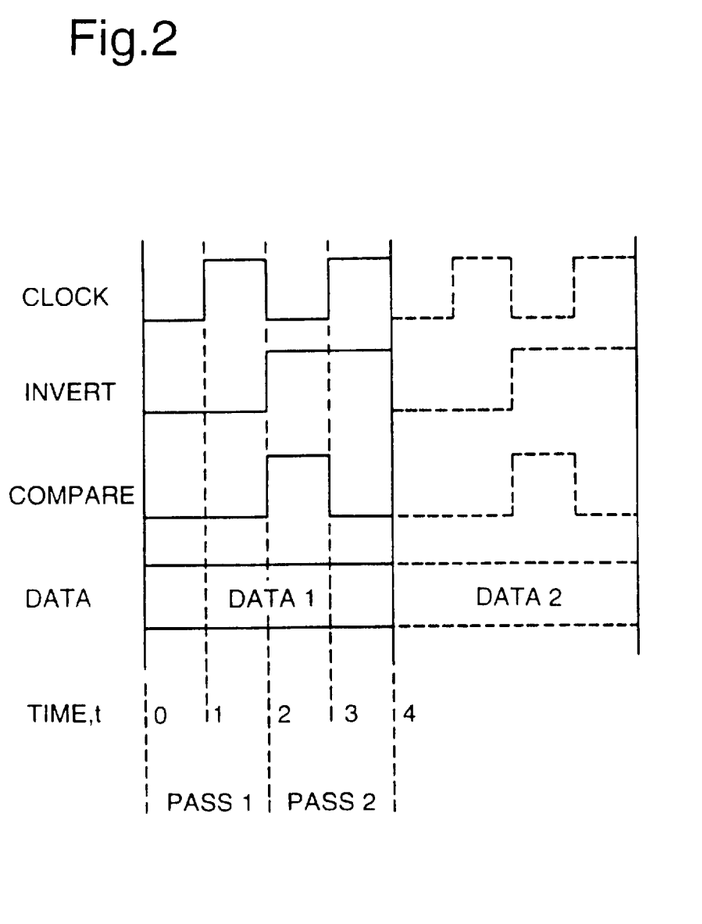
FIG. 2 is a timing diagram of the operation of the circuit of FIG. 1.

The operation of the circuit 10 will now be described with reference to the timing diagram of FIG. 2. At the beginning of a cycle, at time t=0, input numbers A and B are input on input lines 12 to 18 and 20 to 26. They are maintained on these lines for two clock cycles, ie. until time t=4. The numbers A and B pass through inverting circuit 28 without inversion, as it is not enabled by input 30 at this time.

Numbers A and B are thus input to adder circuit 48 on lines 32 to 38 and 40 to 46 respectively. Adder circuit 48 calculates the sum $S_1=A+B$, and the result is output on lines 50 to 58. At the clock signal at t=1 the value of sum $S_1$ on lines 50 to 58 is stored on latch 60. Thus the output from the latch 60 on lines 62 to 70 remains equal to the input $S_1$ on lines 50 to 58 until the next clock signal at t=3. At time t=2, the invert signal to enabling input 30 of inverter circuit 28 becomes high thereby enabling inverter circuit 28. Subsequently inverter circuit 28 generates numbers −A and −B which are output on lines 32 to 38 and 40 to 46 respectively. Adder circuit 48 then calculates the sum $S_2=(-A)+(-B)$, which is output on lines 50 to 58, and consequently on lines 72 to 80 which are connected to lines 50 to 58.

As a result, between times t=2 and t=3 the comparison circuit 82 has inputs equating to $S_1$ on lines 62 to 70, and $S_2$ on lines 72 to 80.

The comparison circuit 82 compares the sums $S_1$ and $S_2$ by adding them ie it is an adder circuit, and the result is output on lines 84 to 92. Between times t=2 and t=3 the signal on enabling input 96 of latch 94 goes high. Subsequently the comparison of $S_1$ and $S_2$ is output on lines 98 to 106 and remains on these lines between times t=3 and t=4.

The circuit 10 detects errors in its operation in the following manner. If the circuit 10 is operating without errors then the output on each of lines 98 to 106 is zero. This is because the comparison circuit 82 adds $S_1$ and $S_2$, which is equivalent to adding (A+B) to ((−A)+(−B)) which equals zero. However, if there is an error in the circuit 10 then one or more of the output bits from the comparison circuit 82 may be a 1.

Generally, at the end of the first pass through the circuit 10, ie. at t=2 before A and B have been inverted, the output from latch 60 is $$S_1 = A+B+e' \qquad (1)$$

where e' is a value introduced by an error in the first pass. When there is no fault e' is zero.

After the second pass, ie when A and B have been inverted, the output from the adder circuit 48 is $$S_2 = -A-B+e'' \qquad (2)$$

where e" is a value introduced by a fault in the second pass. When there is no fault e" is zero.

The output from the latch 94 after t=2 is then $$S_1 + S_2 = (A+B+e') + (-A-B+e'') \qquad (3)$$
$$= e' + e''$$

If the value of (e'+e") is non-zero then an error is present in either $S_1$ or $S_2$ or both. It must be noted that the value of (e'+e") may also be zero if a fault is present.

The following examples demonstrate the operation of the circuit 10 in detecting faults. In these examples the numbers A and B are 1011 and 0111 respectively. These are 2's complement representations of the numbers −5 and +7. Their inverted forms −A and −B are 0101 and 1001 respectively. In the absence of errors the results from the first and second passes through the circuit are $S_1=00010$ and $S_2=11110$. These are the 2's complement forms of +2 and −2 respectively.

EXAMPLE 1—No faults

| 1st Pass | 2nd Pass | Comparison (output on lines 98 to 106) |
|---|---|---|
| A = 11011 | −A = 00101 | $S_1$ = 00010 |
| B = 00111 | −B = 11001 | $S_2$ = 11110 |
| $S_1$ = 00010 | $S_2$ = 11110 | 00000 |

In this example the output from the circuit 10 is equal to zero, which implies that no errors have arisen in the circuit 10.

EXAMPLE 2—Bit $b_1$ is stuck-at-1

| 1st Pass | 2nd Pass | Comparison |
|---|---|---|
| A = 11011 | −A = 00101 | $S_1$ = 00010 |
| B = 00111 | −B = 11011 | $S_2$ = 00000 |
| $S_1$ = 00010 | $S_2$ = 00000 | 00010 |

In this example one of the lines carrying bit $b_1$ is stuck at 1. This results in an error being produced in the second pass through the circuit, but not during the first pass as $b_1$ already has value 1 in the first pass. The comparison of the results from the two passes produces a non-zero result, 00010, on output lines 98 to 106, indicating that a fault has occurred.

EXAMPLE 3—Bit $a_0$ is stuck-at-0

| 1st Pass | 2nd Pass | Comparison |
|---|---|---|
| A = 11010 | −A = 00100 | $S_1$ = 00001 |
| B = 00111 | −B = 11001 | $S_2$ = 11101 |
| $S_1$ = 00001 | $S_2$ = 11101 | 11110 |

Example 2 shows the effects of the line carrying bit $a_0$ being stuck at 0. This produces an error during both passes through the circuit 10. The comparison of the results from the two passes again produces a non-zero output result, 11110, on output lines 98 to 106 which indicates the occurrence of a fault.

EXAMPLE 4—Carry bit in Adder 48 is stuck-at-0

In this example a carry bit resulting from the addition of $a_1$ and $b_1$, and any carry from the addition of $a_0$ and $b_0$, is stuck-at-0.

| 1st Pass | 2nd Pass | Comparison |
|---|---|---|
| A = 11011 | −A = 00100 | $S_1$ = 11110 |
| B = 00111 | −B = 11001 | $S_2$ = 11110 |
| $S_1$ = 11110 | $S_2$ = 11110 | 11100 |

An error is caused in the first pass only. Again, the presence of an error is indicated by the non-zero comparison results.

From the above it can be seen that all of the errors in the Examples 2, 3 and 4 produce different results in the comparison of $S_1$ and $S_2$. Consequently, when a fault occurs the resulting comparison value may provide an indication of the location of the error within the circuit 10.

Figure 3:
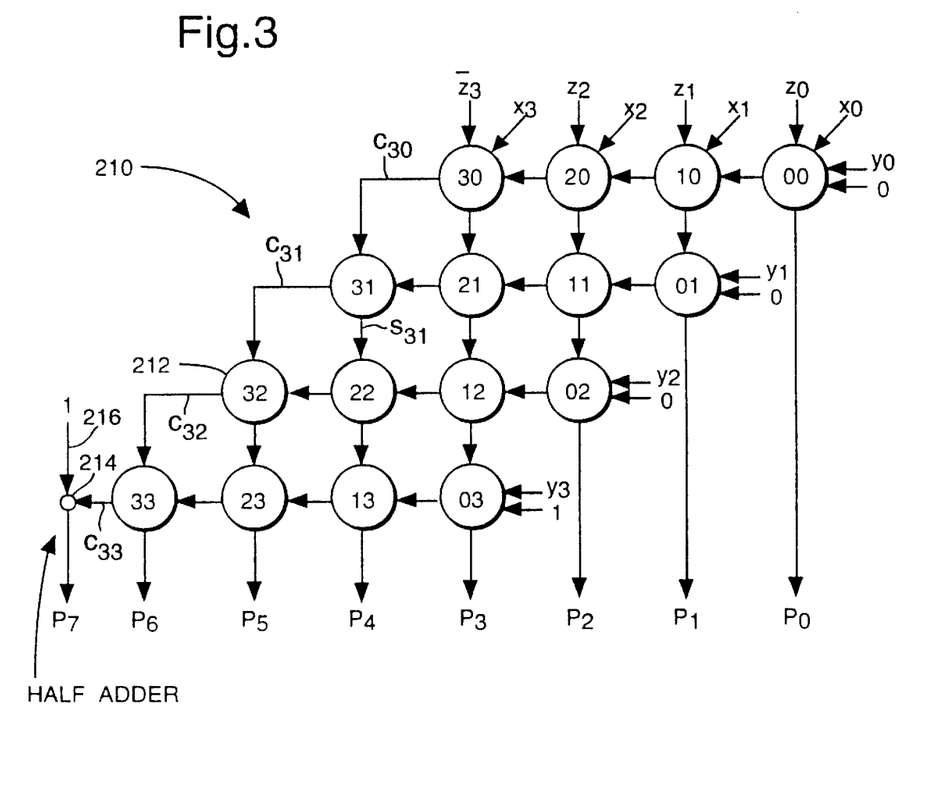
FIG. 3 is a further embodiment of a digital arithmetic circuit of the invention in the form of a multiplier—accumulator.

Referring to FIG. 3, there is shown a schematic diagram of a digital arithmetic circuit of the invention in the form of a 2's complement multiplier-accumulator circuit, indicated generally by 210. The circuit 210 is arranged to receive as inputs 2's complement numbers X, Y and Z, and produce an output P where P=XY+Z. The numbers X, Y and Z are four-bit 2's complement numbers, with respective bits $x_0$ to $X_3$, $Y_0$ to $y_3$ and $z_0$ to $Z_3$. P is an eight-bit 2's complement number represented by bits $p_0$ to $p_7$.

The circuit 210 incorporates four rows of multiplier-adder cells 212 indicated by circles, each row having four such cells. The cells 212 are also arranged in four columns. The cells bear subscript indices i, j indicating column and row positions; ie. cell $212_{ij}$ is the $j^{th}$ cell in the $i^{th}$ column (i=0 to 3, j=0 to 3). The column index i increases in the right-to-left direction, so that cells $212_{0j}$ (j=0 to 3) are the rightmost cells. Similarly, row index j increases in the top-to-bottom direction, so that cells $212_{i0}$ (i=0 to 3) are the topmost cells. The columns are skewed such that the cell $212_{ij}$ is located below cell $212_{i+1, j-1}$; ie a cell in row i is displaced from the cell in row (i−1) in the same column by one cell in the left direction.

The cells 212 are connected to their respective column neighbours by connections such as x, and to their row neighbours by connections such as y. They are also connected to their neighbours in the next highest row by connections such as s. For example, cell $212_{22}$ is connected to cell $212_{31}$ by connection $s_{31}$. Not all connections of the kind x, y and z are referenced to reduce illustrational complexity.

A carry input, $carry_j$ is input to the right most cell $212_{0j}$ of each row. This input has the value 0 for each of rows j=0, 1 and 2, and the value 1 for row j=3. Each cell 212 in each row has a carry connection, such as $c_{11}$, to its neighbouring cell 212 in the row. Additionally, cells $212_{30}$, $212_{31}$ and $212_{32}$ have carry connections $c_{30}$, $c_{31}$, and $c_{32}$ to the next lower cell 212 in the same column i=3; ie the connections are to cells $212_{31}$, $212_{32}$ and $212_{33}$.

Cell $212_{33}$ has a carry connection $c_{33}$ to a half adder 214. The half adder 214 has an input 216 which is set at 1.

The circuit 210 has eight outputs. Each output is a bit in the 2's complement output P. They are denoted by lines $p_0$ to $p_7$. Lines $p_0$ to $p_3$ are outputs from cells $212_{00}$, $212_{01}$, $212_{02}$ and $212_{03}$; ie they are outputs from each cell in the column i=0. The outputs $p_4$ to $p_6$ are outputs from the cells $212_{13}$, $212_{23}$ and $212_{33}$; ie. they are outputs from the cells 212 in the columns i=1, 2 and 3. Output $p_7$ is an output from the half adder 214.

The cells 212 in the top row, j=0 receive inputs corresponding to the 2's complement numbers X and Z is input to the cell $212_{i0}$ corresponding to the respective bit designation. For example, bits $x_2$ and $z_2$ are input to cell $212_{20}$. Similarly, bits $x_1$ and $a_1$ are input to cell $212_{10}$.

The cells in the rightmost column, i=0, receive inputs corresponding to the 2's complement number Y. Each bit $y_0$ to $y_3$ is input to the cell $212_{0j}$ corresponding to the respective bit designation. For example, bits $y_1$ and $y_2$ are input to cells $212_{01}$ and $212_{02}$.

Figure 4:
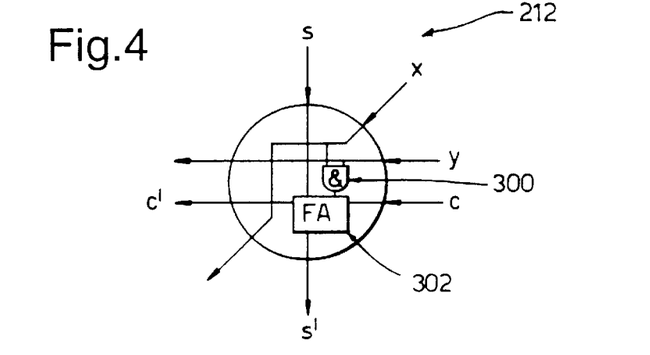
FIG. 4 is a cell of the circuit of FIG. 3.

Referring to FIG. 4, there is shown a schematic diagram of the logic and connections of a cell such as $212_{ij}$. Each cell $212_{ij}$ has two components: an AND gate 300 and a full adder 302.

Each AND gate such as 300 has two inputs: an input from a diagonal line x and a transverse input from line y. Line x forms a column through-interconnection to cell $212_{ij}$ from cell $212_{i, j-1}$ through to cell $212_{i, j+1}$. Similarly, line y forms a row through-interconnection to cell $212_{ij}$, from cell $212_{i-1, j}$ through to cell $212_{i+1, j}$. Consequently bits on lines x and y are passed to all cells 212 in their respective columns and rows simultaneously. The adder 302 receives a sum input s from above and a second input consisting of the output of the AND gate 300. It also receives a carry bit input at c from the right and generates a carry bit output at c' to the left.

The lines x and y provide bits from numbers X and Y. Each AND gate 300 "ANDs" the bits on lines x and y connected to it. It produces a partial product of these bits providing an input to the full adder 302, which receives a second input from the line s and a third input from the carry line c. For cells 212 in rows for which j>0, the input lines s are connected to cell $212_{ij}$ and each provides a respective bit from its diagonally above neighbour cell $212_{i+1, j-1}$. The carry line c provides a carry bit from cell $212_{i-1, j}$ in the same row. The full adder carry output c' provides a carry bit to the next cell $212_{i+1, j}$ in the row where available. Its sum output s' provides a partial sum for input to the next cell $212_{i-1, j+1}$.

The input bit $z_3$ to cell $212_{30}$ is inverted. This is because it is the most significant bit (msb) of the two's complement number Z and has a negative weight.

Cells $212_{30}$, $212_{31}$, $212_{32}$, $212_{23}$, $212_{13}$ and $212_{03}$ have a NAND gate (not shown) replacing AND gate 300. This is because these cells 212 involve the interaction of sign bits such as $X_3$ with non-sign bits and produce partial products with negative weights. The replacement of AND gate 300 with a NAND gate inverts the partial product prior to summation by full adder 302.

The operation of the circuit 210 will now be described. Bits $x_0$ to $X_3$ corresponding to number X are input to the circuit 210 via the respective cells $212_{i0}$ at the top row, as previously described. Bits $y_0$ to $y_3$ are input via cells $212_{0j}$ on the right hand side of the circuit 210. The bits $x_0$ to $X_3$ are also passed to the remaining cells in the respective input column via cell 212 interconnections as previously described. Similarly, bits $y_0$ to $y_3$ are also passed to remaining cells in the respective input row, also as described. Consequently each bit of number X forms a partial product with each bit of number Y in the cells 212 of the input column. For example, bit $x_2$ forms partial products with $y_0$ in cell $212_{20}$; with $y_1$ in cell $212_{21}$; with $y_2$ in cell $212_{22}$; and with $y_3$ in cell $212_{23}$.

Bits $z_0$ to $Z_3$ corresponding to number Z are also input to the circuit 210 via respective top row cells $212_{i0}$, as previously described. In the cells $212_{i0}$ each bit $z_0$ to $Z_3$ is added in a full adder such as 302 to the partial product from the bits $y_0$ with $x_0$ to $X_3$.

From the above it can be seen that the function of the circuit 210 is to multiply together numbers X and Y, forming partial products in cells 212, and add a third number Z. The various partial products are summed within the cells 212, flowing from top to bottom on output lines such as s'. The final product is the value P=XY+Z which appears at output lines $p_0$ to $p_7$ as previously described.

Figure 5A:
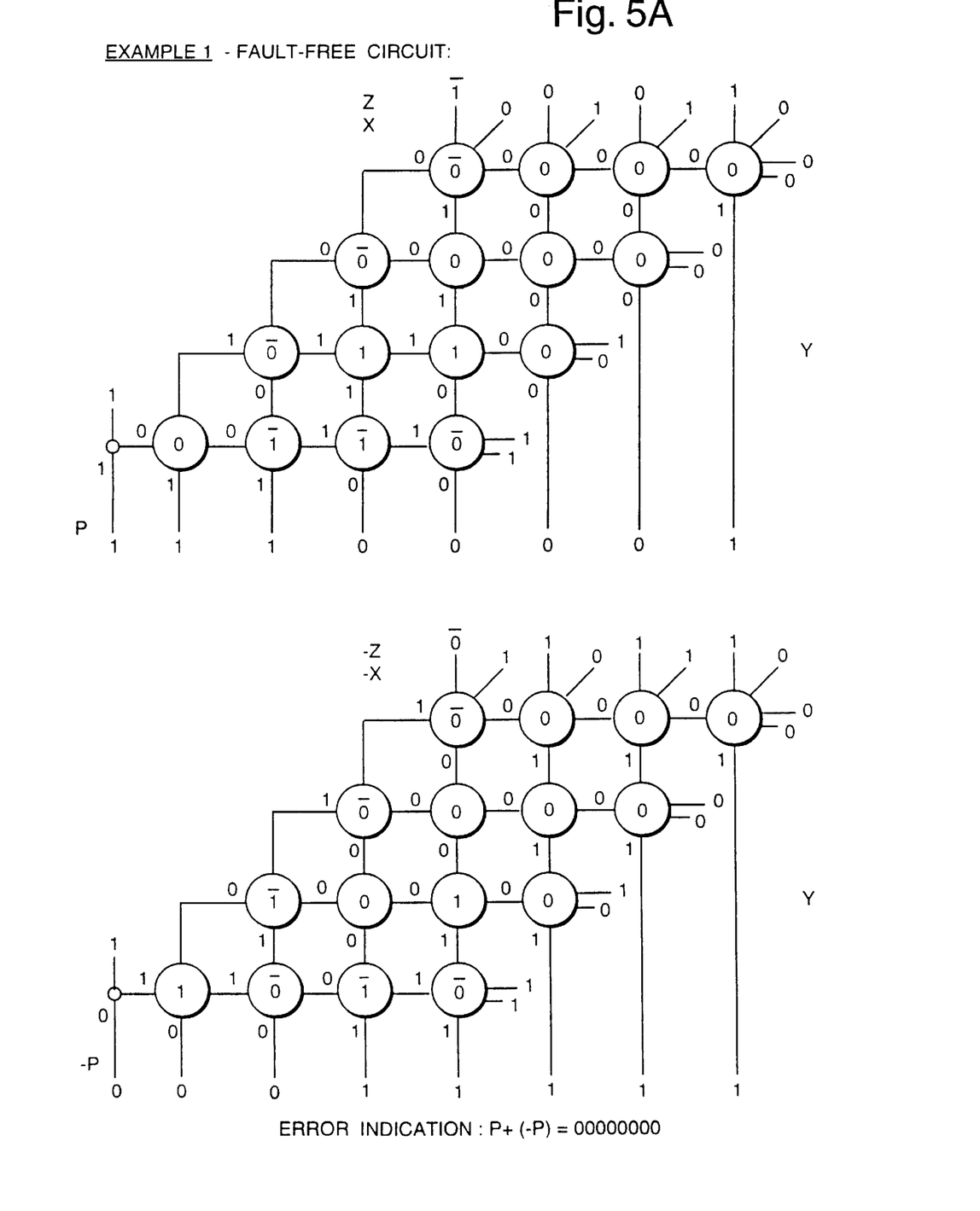
FIGS. 5A–5C are a series of examples of the circuit of FIG. 3 in error detection operation.
Figure 5B:
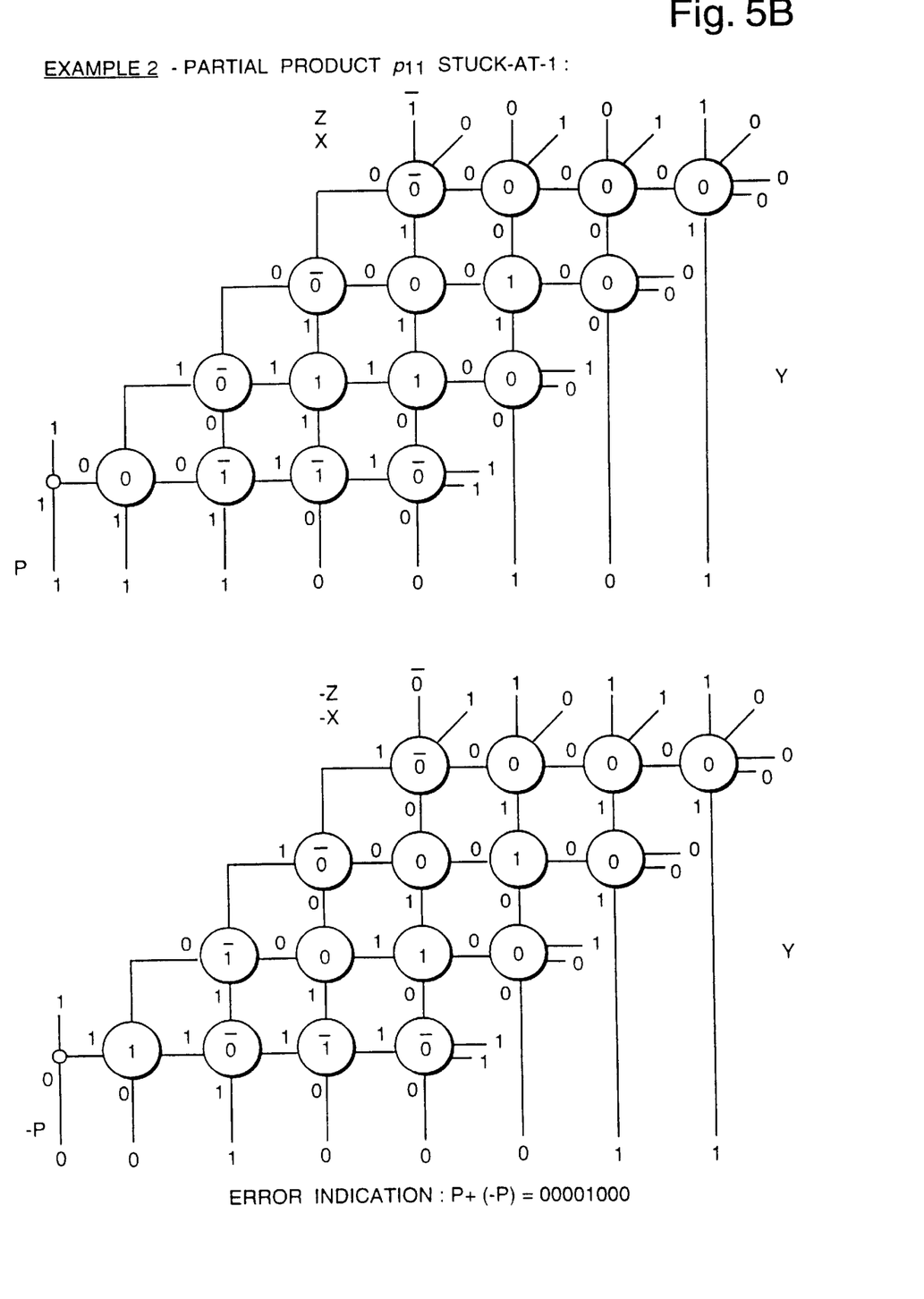
Figure 5C:
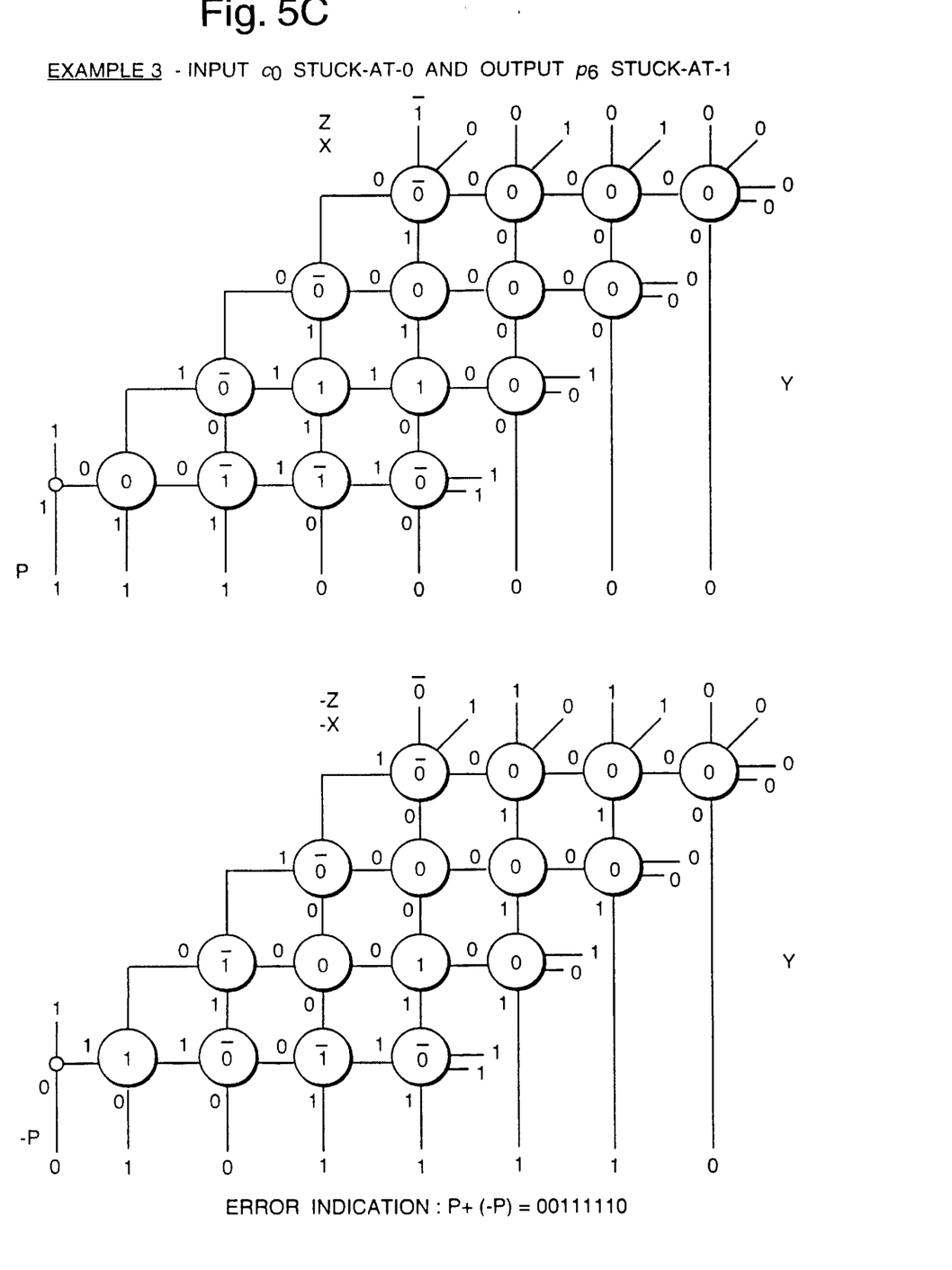

Error detection in the circuit 210 will now be described. FIGS. 5A–5C show three examples of the operation of the circuit 210. For clarity, the cell designations have been removed. The number in each cell circle corresponds to the partial product calculated in that cell. The numbers on the horizontal output lines from the cells are respective cell carry output values; and the numbers on the vertical lines are the partial sum bit outputs corresponding to s'.

The examples of FIGS. 5A–5C illustrate the operation of the circuit with operands values as follows: X=6 (0110), Y=−4 (01100) and Z=−7 (1001). The value of P output from the circuit is P=11100001.

For error detection the value of –P is generated. To achieve this the input operands X and Z are inverted, but not Y. Alternatively, Y and Z could be inverted leaving X unchanged. The operand values for the inversion of P are then as follows: –X=–6 (1010), Y=–4 (1100) and –Z=7 (0111).

In FIG. 5A, Example 1 illustrates the operation of the circuit 210 with no errors present. In this example the output –P is equal to 00011111. The addition of P and –P produces a sum of 00000000, indicating no fault has occurred.

In FIG. 5B, Example 2 illustrates the operation of the circuit 210 with an error in cell $212_{11}$. Here the partial product is stuck-at-1. This results in the output P being 11100101. On the second pass through the circuit, with operands inverted, the output –P is 00100011. The sum of P and –P is therefore equal to 00001000. As the sum is non-zero there is an indication that a fault has occurred.

In FIG. 5C, Example 3 illustrates the effects of two errors occurring simultaneously. Here $z_0$ is stuck-at-0 on input and output $p_6$ is stuck-at-1. The error introduced by $z_6$ stuck-at-0 causes an error on both passes whereas $p_6$ stuck-at-1 causes an error only during the second pass. The result is that output P on the first pass is 11100000, and output –P on the second pass is 01011110. The sum of P and –P is 00111110, again indicating the occurrence of an error.

As for the circuit 10, a non-zero summation of the outputs with operands unchanged and then inverted provides an indication that a fault has occurred. Additionally, the actual value of the summation may provide an indication of the location of the fault. As for circuit 10, the error detection is carried out by time redundancy, ie by making two passes through one circuit. It is also possible to achieve error detection using hardware redundancy, ie by having two or more circuits such as 210 arranged to calculate –P with inverted operands. This would enable error detection to be carried out without loss of processing time.

The error detection scheme described may be operated on any circuit with multiple operands at least one of which may be inverted. The error detection scheme may also be operated on circuits using signed binary number representation (SBNR).

The invention may also be used for providing a non-zero summation value in error-free operation. For example, a circuit output Y representing an incremental addition to an input operand X is given by Y=X+1. Inverting X on a second pass produces an output Y=–X+1. A comparison of outputs from first and second passes produces a summation S=(X+1)+(–X+1) which is equal to 2 for error-free operation. In this example an error in circuit operation is detected when the comparison value is a number other than 2.

I claim:

1. A digital arithmetic circuit (10) comprising processing means for performing an arithmetic operation on at least one input operand and for generating a result signal in response thereto and means (12 to 18) for inputting said at least one input operand to the processing means, wherein said processing means comprises:
   (i) means (28) for inverting at least one operand input to the processing means,
   (ii) means (210) for performing said arithmetic operation on said at least one input operand and for performing said arithmetic operation on at least one inverted operand, and
   (iii) means (82) for comparing result signals from said operations to provide an indication of an error in circuit operation, and that the processing means is arranged to perform an arithmetic operation other than the arithmetic operations of exclusively addition and subtraction on the at least one input operand.

2. A circuit according to claim 1, wherein said processing means is arranged to compute result signals for inverted operands concurrently with the calculation of result signals for non-inverted operands.

3. A circuit according to claim 2, wherein said input means is arranged to supply at least two input operands.

4. A circuit according to claim 3, wherein said input operands are 2's complement numbers.

5. A circuit according to claim 4, wherein said processing means includes a multiplier-accumulator circuit.

6. A circuit according to claim 1, wherein said processing means is arranged to generate a result signal from inverted operands at a different time to generation of a result signal from non-inverted operands.

7. A circuit according to claim 1, wherein said circuit is arranged to provide a non-zero comparison value in response to the occurrence of an error in circuit operation.

8. A digital arithmetic circuit (10) comprising processing means for performing an arithmetic operation on at least one input operand and for generating a result signal in response thereto and means (12 to 26) for inputting said at least one input operand to the processing means, wherein said processing means comprises:
   (i) means (28) for inverting at least one operand input to the processing means,
   (ii) means (48, 210) for performing said arithmetic operation
      (a) on one or more operands excluding inverted operands, and
      (b) on one or more operands including at least one inverted operand, and
   (iii) means (82) for comparing result signals from said operations to provide an indication of an error in circuit operation.

9. A method of detecting errors in operation of a digital arithmetic circuit wherein said method includes the steps of:
   (i) supplying at least one input operand to the circuit;
   (ii) inverting at least one of said at least one input operand;
   (iii) performing an arithmetic operation
      (a) on one or more operands excluding inverted operands, and
      (b) on one or more operands, including at least one inverted operand, and
   (iv) comparing outputs resulting from said operations to provide a comparison value indicative of at least one error in circuit operation.

10. A digital arithmetic circuit for performing an arithmetic operation on at least one input operand and for generating a result signal in response thereto, said circuit having at least one input operand, said circuit comprises:
   (i) an inverting circuit, responsive to said at least one input operand, providing an inverted at least one operand output,
   (ii) an arithmetic circuit, responsive to said at least one input operand and said inverted at least one operand output, operating on said at least one input operand to provide an arithmetic output and operating on at least one inverted operand to provide an inverted arithmetic output, said arithmetic circuit performing an arithmetic operation other than the arithmetic operations of exclusively addition and subtraction on said at least one input operand, and (iii) comparison circuit, responsive to said arithmetic output and said inverted arithmetic output, for providing an indication of the occurrence of an error in circuit operation.

11. A digital arithmetic circuit according to claim 10, wherein said arithmetic circuit is arranged to compute said arithmetic output and said inverted arithmetic output concurrently.

12. A digital arithmetic circuit according to claim 11, wherein said at least one input operand comprises at least two input operands.

13. A digital arithmetic circuit according to claim 12, wherein said at least two input operands are 2's complement numbers.

14. A digital arithmetic circuit according to claim 13, wherein said arithmetic circuit includes a multiplier-accumulator circuit.

15. A digital arithmetic circuit according to claim 10, wherein said arithmetic circuit is arranged to compute said arithmetic output and said inverted arithmetic output at different times.

16. A digital arithmetic circuit according to claim 10, wherein said comparison circuit provides a non-zero comparison value in response to the occurrence of an error in circuit operation.

* * * * *